United States Patent
Li

(10) Patent No.: US 10,284,295 B2
(45) Date of Patent: May 7, 2019

(54) RADIO OVER FIBER NETWORK NODE, RADIO ACCESS POINT, AND COMMUNICATION SYSTEM

(71) Applicant: Industrial Technology Research Institute, Hsinchu (TW)

(72) Inventor: Che-Hao Li, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 85 days.

(21) Appl. No.: 15/299,475

(22) Filed: Oct. 21, 2016

(65) Prior Publication Data

US 2018/0115367 A1  Apr. 26, 2018

(51) Int. Cl.
   *H04B 10/2575*  (2013.01)

(52) U.S. Cl.
   CPC .............. *H04B 10/25752* (2013.01)

(58) Field of Classification Search
   None
   See application file for complete search history.

(56) References Cited

U.S. PATENT DOCUMENTS

| | | |
|---|---|---|
| 5,710,651 A | 1/1998 | Logan, Jr. |
| 6,111,678 A | 8/2000 | Mathoorasing et al. |
| 6,459,521 B1 * | 10/2002 | Bakker ............ H01S 5/0265 359/238 |
| 6,556,327 B1 * | 4/2003 | Ohya ............ H04B 10/505 398/141 |
| 7,369,715 B2 | 5/2008 | Darcie et al. |
| 7,627,250 B2 | 12/2009 | George et al. |
| 8,041,222 B2 | 10/2011 | Lee et al. |
| 8,358,933 B2 | 1/2013 | Yu et al. |

(Continued)

FOREIGN PATENT DOCUMENTS

| | | |
|---|---|---|
| CN | 101459917 | 1/2011 |
| CN | 101335568 | 4/2011 |

(Continued)

OTHER PUBLICATIONS

Pang et al., "25 Gbit/s QPSK Hybrid Fiber-Wireless Transmission in the W-Band (75-110 GHz) With Remote Antenna Unit for In-Building Wireless Networks," IEEE Photonics Journal, Jun. 2012, pp. 691-698.

Ngo et al, "ElectroAbsorption Modulated Laser Integrated with a Semiconductor Optical Amplifier for 100-km 10.3 Gb/s Dispersion-Penalty-Free Transmission," Journal of Lightwave Technology, Jan. 15, 2013, pp. 232-238.

(Continued)

*Primary Examiner* — Kenneth N Vanderpuye
*Assistant Examiner* — David W Lambert
(74) *Attorney, Agent, or Firm* — JCIPRNET

(57) ABSTRACT

The disclosure is directed to a radio over fiber (RoF) network node, base station, and communication system. In one of the exemplary embodiments, the disclosure is directed to a radio over fiber (RoF) network node which includes not limited to: a laser source which transmits a first laser beam having a first wavelength; a first Electroabsorption Modulated Laser (EML) which modulates a first electrical signal into a second laser beam that is modulated and has a second wavelength; and a first optical coupler which is coupled to the laser source and the EML and transmits an output laser beam having a first carrier frequency which is determined based on a difference between the first wavelength and the second wavelength.

17 Claims, 17 Drawing Sheets

(56) References Cited

U.S. PATENT DOCUMENTS

| | | | |
|---|---|---|---|
| 2006/0182446 A1* | 8/2006 | Kim | H04B 10/25752 398/72 |
| 2007/0292143 A1 | 12/2007 | Yu et al. | |
| 2009/0202245 A1* | 8/2009 | Bouda | H04J 14/0226 398/76 |
| 2011/0044692 A1* | 2/2011 | Chan | H04B 10/25752 398/115 |
| 2013/0170840 A1 | 7/2013 | Chang et al. | |
| 2013/0230328 A1 | 9/2013 | Fan et al. | |
| 2015/0050026 A1* | 2/2015 | Samsuri | H04B 10/2503 398/116 |

FOREIGN PATENT DOCUMENTS

| | | |
|---|---|---|
| CN | 101847829 | 9/2012 |
| CN | 104601240 | 5/2015 |
| CN | 103500913 | 11/2015 |
| TW | 201519588 | 5/2015 |

OTHER PUBLICATIONS

Chien et al., "Optical Millimeter-Wave Generation and Transmission Without Carrier Suppression for Single- and Multi-Band Wireless Over Fiber Applications," Journal of Lightwave Technology, Aug. 15, 2010, pp. 2230-2237.

Hsueh et al., "A Novel Bidirectional 60-GHz Radio-Over-Fiber Scheme With Multiband Signal Generation Using a Single Intensity Modulator," IEEE Photonics Technology Letters, Sep. 15, 2009, pp. 1338-1340.

Li et al., "Performance improvement by pre-equalization in W-band (75-110GHz) RoF system," Optical Fiber Communication Conference and Exposition and the National Fiber Optic Engineers Conference (OFC/NFOEC), Mar. 17-21, 2013, pp. 1-3.

Kanno et al., "Analyses of carrier frequency fluctuation of W-band RoF signals using two free-running lasers for high-speed RoF transmission," Conference on Lasers and Electro-Optics, May 6-11, 2012, pp. 1-2.

"Office Action of Taiwan Counterpart Application," dated Dec. 29, 2017, p. 1-p. 3, in which the listed references were cited.

\* cited by examiner

RADIO OVER FIBER NETWORK NODE, RADIO ACCESS POINT, AND COMMUNICATION SYSTEM

TECHNICAL FIELD

The disclosure is directed to a radio over fiber (RoF) network node, a radio access point (RAP), and a communication system.

BACKGROUND

As high quality multimedia applications continue to require an increasing amount of resources, the demand for higher data transmission rate is also increasing accordingly. In order to achieve high data transmission rates and to provide large transmission bandwidths, data has been transmitted via high frequency carriers in the meter wave or terahertz wave range. Although, transmissions via millimeter wave and terahertz wave would usually incur higher transmission losses than transmissions via microwaves, Radio-over-Fiber (RoF) communication systems could be leveraged to transmit data from a base station to a central platform in order to increase the wireless coverage of a communication system. Also, using a fiber to transmit data would incur lesser transmission losses than transmissions via traditional coaxial cables. Hence, the RoF technology that uses millimeter wave or terahertz wave has garnered increased attentions in recent years.

SUMMARY OF THE DISCLOSURE

Accordingly, the present disclosure is directed to a radio over fiber (RoF) network node, radio access point, and communication system.

In one of the exemplary embodiments, the disclosure is directed to a radio over fiber (RoF) network node which includes not limited to: a laser source which transmits a first laser beam having a first wavelength; a first Electroabsorption Modulated Laser (EML) which transmits a second laser beam having a second wavelength that is modulated by the first electrical signal; and a first optical coupler which is coupled to the laser source and the first EML and transmits an output laser beam having a first carrier frequency which is determined based on a difference between the first wavelength and the second wavelength.

In one of the exemplary embodiment, the disclosure is directed to a radio over fiber (RoF) radio access point (RAP) which includes not limited to: a first optical splitter which receives an input optical signal and divides the input optical signal into a first optical signal and a second optical signal; a first photodetector (PD) which is coupled to the first optical splitter, receives the first optical signal, and converts the first optical signal into a first electrical signal; and a second PD which is coupled to the first optical splitter, receives the second optical signal, and converts the second optical signal into a second electrical signal, wherein the first electrical signal and the second electrical signal are derived from the input optical signal.

In one of the exemplary embodiment, the disclosure is directed to a radio over fiber (RoF) communication system which includes not limited to: a network node which would include not limited to: a laser source which transmits a first laser beam having a first wavelength; a first Electroabsorption Modulated Laser (EML) which transmits a second laser beam having a second wavelength that is modulated by a first electrical signal; and a first optical coupler which is coupled to the laser source and the EML and transmits an output laser beam having a first carrier frequency which is determined based on a difference between the first wavelength and the second wavelength.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
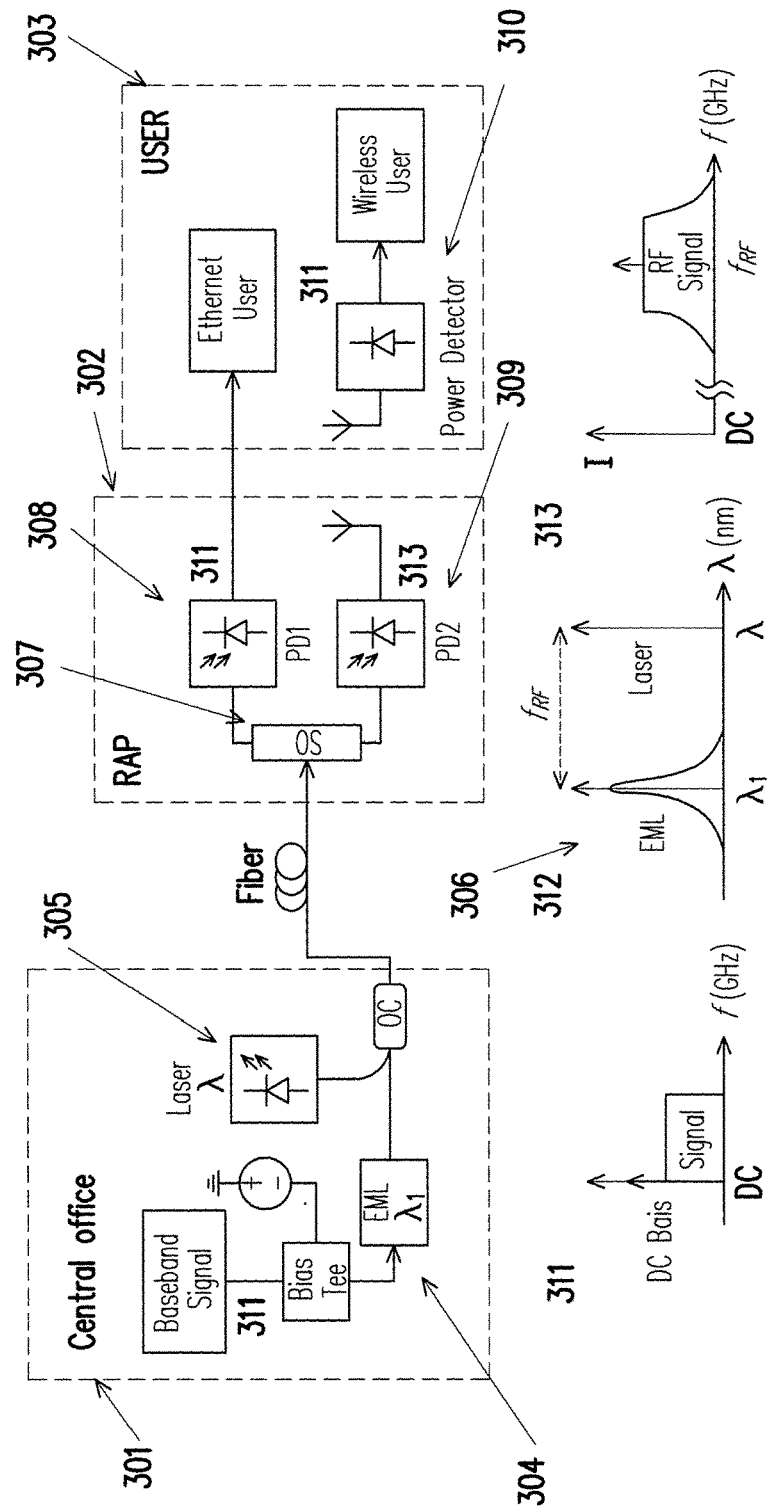
FIG. 1 illustrates an exemplary RoF communication system in accordance with a first exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Relative to a Direct Modulation Laser (DML), an Electroabsorption Modulated Laser (EML) in general not only may possess a higher transmission bandwidth but also may exhibit a lower chirp and thus would be able to transmit data over a much greater distance as the data would undergo less dispersion due to the influence of the fiber. Further, relative to a Mach-Zehnder modulator (MZM), a EML would cost less to manufacture and is easier to integrate and thus could be utilized by a communications system that requires low costs and high ease of integration.

To design a communication system, it could be critical to be able to support different types of signal formats. By directly sending multiband electrical signals into an optical modulator, utilizing the method of loading light sources of different wavelengths would not be restricted by the bandwidths of the optical modulator especially when operating with millimeter wave or terahertz wave for which very optical modulators of very high bandwidths could be required.

In light of the above mentioned considerations, the disclosure proposes a low cost and easy to integrate multiband Radio-over-Fiber (RoF) communication system. The downlink path of the proposed multiband RoF communication system would utilize Electroabsorption Modulated Laser (EML) which allows the electrical and optical components of a Central Office to be easily integrated. Also, the high frequency signal would be generated by a wavelength difference of laser sources sent through a PD to be converted into electrical signals via an optical-electro converter. The electrical signal is subsequently frequency down converted by using a power detector. Furthermore, the frequency down converted signal may undergo an optical-to-electrical conversion to generate a baseband signal which would be usable by Ethernet. The proposed multiband RoF communication system for downlink transmissions requires neither a mixer nor a local oscillator so as to remain low cost. For uplink transmissions, a mixer and a local oscillator may still be used. By using EMLs of different wavelengths, the proposed RoF communication system would operate in multiple frequency bands. The uplink of the proposed multiband RoF communication system may also utilize EMLs in order for Radio Access Point (RAP) to be easily integrated. Further, the uplink may also utilize Optical Circulator in order to lower the cost of low distance transmission.

FIG. 1 illustrates an exemplary RoF communication system in accordance with a first exemplary embodiment of the disclosure. The communication system would include not limited to a network node, a base station, and a user equipment (UE). The network node could be a central platform or a Central Office (CO) 301 which is connected to at least one radio access point (RAP) 302 through an external hardware connection such as a fiber optical connection. The RAP 302 could be considered as a base station which extends the coverage of the Central Office 301 at a remote location. The RAP 302 would be connected to one or more user equipment (UE) 303 through a wireless connection or a cabled connection. Although the structure as shown in FIG. 1 includes the downlink path, an ordinary person skilled in the art would certainly know that a RoF communication system would include not limited to merely the downlink path.

The principle of operation of the exemplary multiband RoF communication system of FIG. 1 is elucidated as follows. For the downlink path, a baseband signal having a baseband waveform 311 could be assumed to have been generated by the Central Office 301. The baseband waveform 311 would be direct current (DC) biased to have the proper dynamic voltage range suitable for an EML according to biasing circuit such as a Bias Tee a shown in FIG. 1. The DC biased baseband signal would subsequently be sent to an EML 304 which would convert the DC biased baseband signal into a laser beam having a frequency distribution centered around wavelength $\lambda_1$. The characteristics such as the wavelength length of the laser beam of the EML would essentially be modulated in proportion to the DC voltage of the DC biased baseband signal. In other words, the EML 304 would generate a laser beam which is modulated by the DC biased baseband signal. The optical spectrum of the laser beam generated by the EML 304 could be, for example, the optical spectrum 306 as shown in FIG. 1. The laser beam generated by the EML 304 would be sent to a first optical coupler (OC) which would also receive a laser beam of wavelength $\lambda$ from a laser source 305 as shown in FIG. 1. The first OC could be synonymous with an optical combiner. Similarly, the first OC may also be a coupler that includes an optical combiner. The laser beam of wavelength $\lambda$ generated by the laser source 305 could be local to the main circuit board(s) of the Central Office or could be an externally inserted laser 305. As shown in the subplot 312 of FIG. 1, the output of the OC would be an output laser beam of frequency $f_{RF}$ which is determined based on the difference between $\lambda$ and $\Delta_1$. The output laser beam would be transmitted over a fiber optic cable to be received by the RAP 302 as an input optical signal.

Since the laser beam generated by the EML 304 is intensity modulated, after the DC biased baseband signal is converted into a laser beam having a wavelength $\lambda_1$, the laser beam $\lambda_1$ would have two frequency bands to be delivered to the RAP 302 and the UE 303. One frequency band is a baseband waveform (e.g. 311) generated by the Beating effect and the other frequency band is a radio frequency (RF) signal (e.g. 313) also generated as the result of the Beating effect. Therefore, the two passbands could be separated by an optical splitter (OS) 307 which splits the input optical signal into a first optical signal and a second optical signal. After the laser beam generated by CO 301 is received by the OS 307, the baseband waveform 311 could be recovered by the first PD 308 which would perform an optical-to-electrical conversion to recover the baseband waveform 311 from the first optical signal. The recovered baseband waveform 311 could then be transmitted to a UE 303 via a cabled or wireless network connection such as the Ethernet. Similarly, after the laser beam generated by CO 301 is received by the OS 307, the RF signal 313 could be recovered from the second optical signal by the second PD 309 and subsequently be transmitted to the UE 303 via a RF wireless interface such as a wireless transmitter having an antenna. Since the RF signal 313 which is transmitted to the UE 303 is an intensity modulated signal, the RF signal 313 could be frequency down converted to a baseband signal by the Power Detector 310 of the UE 303. The baseband signal could then be converted to a digital signal to be read by a processor. It is worth noting that the OS 307 may also be synonymous with an optical combiner or an optical coupler for the reason that optical transmissions may flow both ways within an optical device and thus a first optical transmission flowing one way could be split into multiple optical transmissions while a second and a third optical transmission flowing the other way could be combined by the same optical device.

Notice that the RoF communication system of FIG. 1 requires neither any mixer nor any local oscillators for frequency up conversion and frequency down conversion. In this way, the design complexity and the cost of the overall system could be decreased, and the ease of integration may be enhanced. Also, complex tasks of the RAP 302 could be moved to the Central Office 301 and thus the cost of the RAP 302 may be reduced without sacrificing the overall coverage of the proposed multiband RoF communication system of FIG. 1.

Figure 2A:
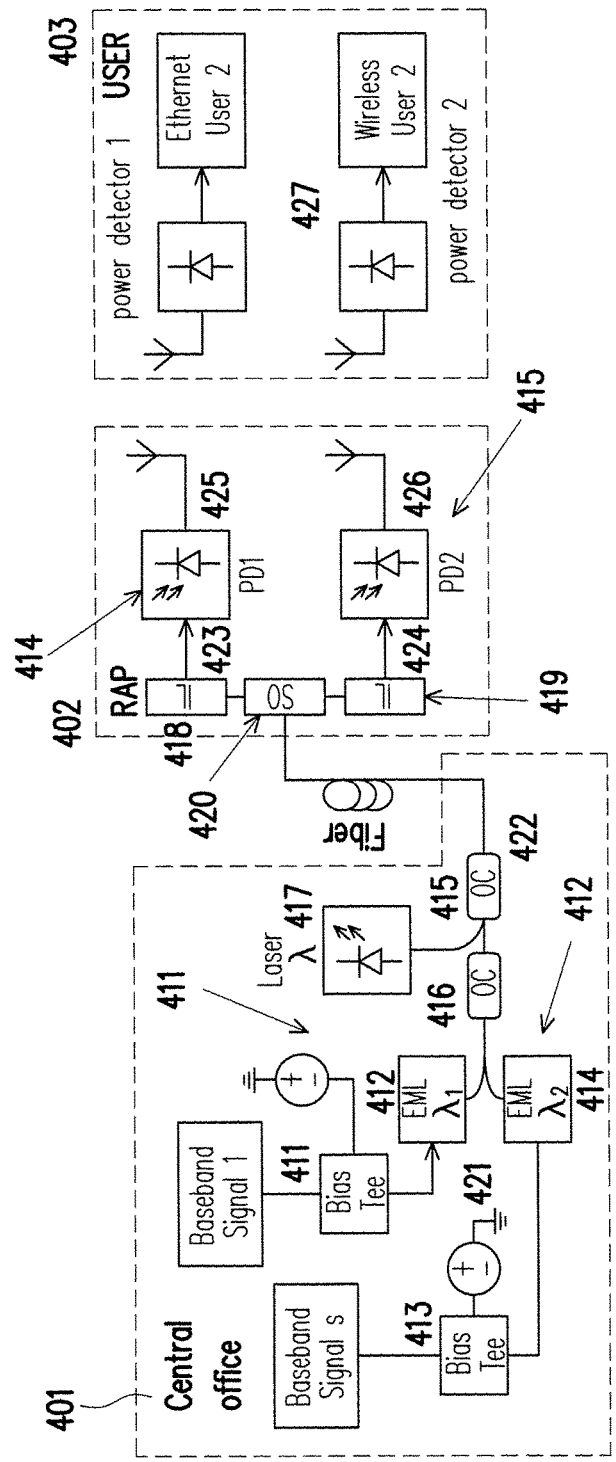
FIGS. 2A & 2B illustrate an exemplary RoF communication system in accordance with a second exemplary embodiment of the disclosure.
Figure 2B:
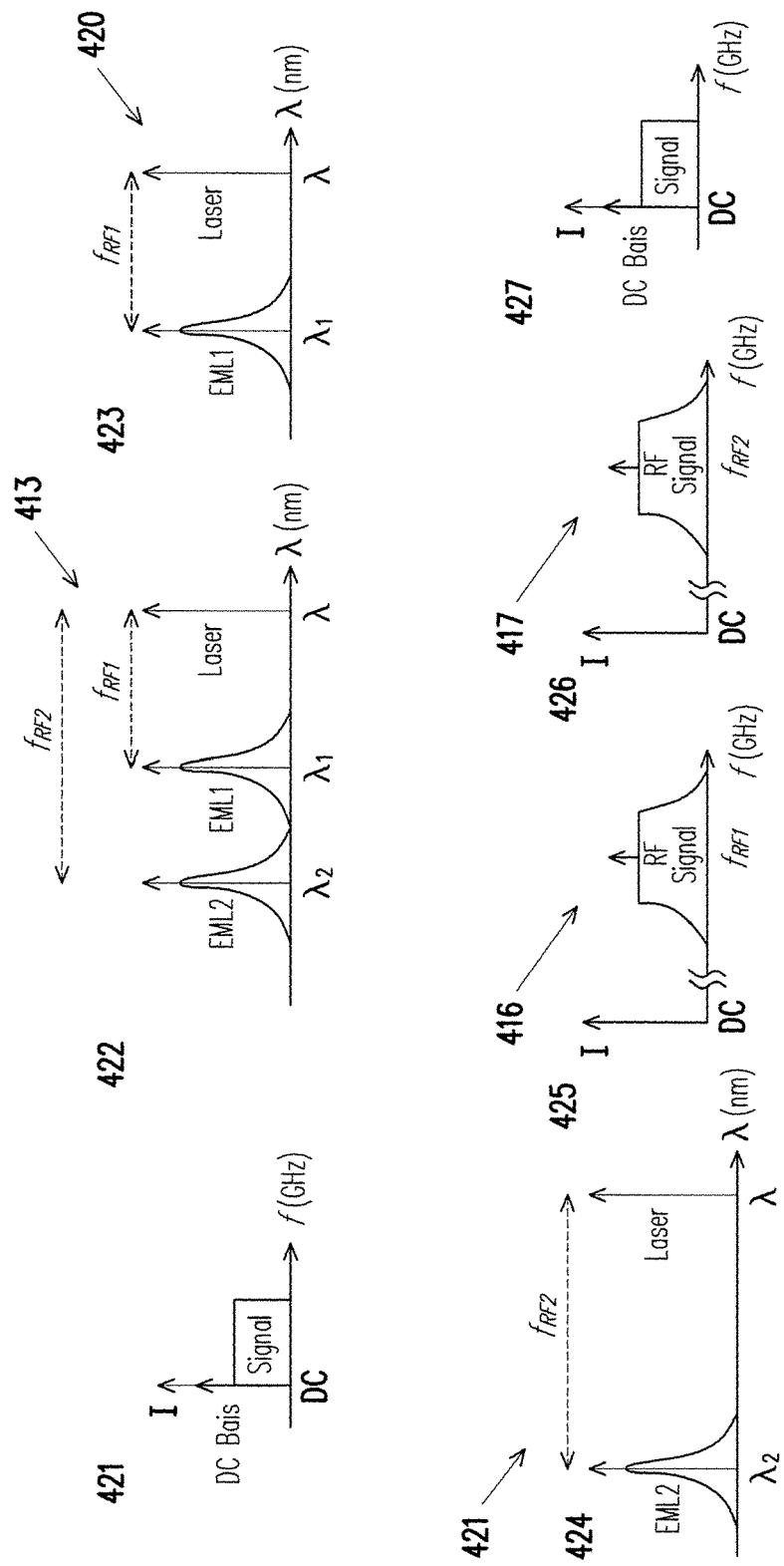

FIGS. 2A & 2B illustrates an exemplary RoF communication system in accordance with a second exemplary embodiment of the disclosure. The principle of operation of the second exemplary is similar to the first exemplary embodiment but multiple EMLs could be utilized to transmit multiple baseband signals in the downlink path via multiple frequency spectrums. By using EMLs to modulate each of the multiple baseband signals to a different wavelength, the multiple baseband signals would be able to be transmitted via different carrier frequencies generated according to the differences between wavelengths of the EML lasers and a laser source.

The exemplary embodiments of FIG. 2A may include not limited to a network node (e.g. Central Office) 401, a RAP 402, and one or more UE terminals 403. The network node 401 may include not limited to a first Bias Tee 411, a first EML 412, a second Bias Tee 413, a second EML 414, a first optical coupler 415, a second optical coupler 416, and a laser source 417. The RAP 402 may include not limited to a first interleaver 418, a second interleaver 419, an optical splitter 420, a first photodetector (PD1), a second photodetector (PD2), a first wireless transmitter (not shown) coupled to PD1, and a second wireless transmitter (not shown) coupled to PD2. The one or more UE terminals 403 may include not limited to a first wireless UE and a second wireless UE. The first wireless UE may include a first wireless receiver (not shown) coupled to a first power detector, and the second wireless UE may include a second wireless receiver coupled to a second power detector.

Within the network node 401, the first Bias Tee 411 would receive a first baseband signal and perform DC biasing on the first baseband signal so that the first EML's input voltage, being in the proper voltage range, would allow the first EML to be modulated by the DC biased first baseband signal so as to output an optical signal having the full dynamic range. Likewise, the second Bias Tee 412 would receive a second baseband signal and perform DC biasing on the second baseband signal. An example of the biased second baseband signal is shown in subplot 421 of FIG. 2B. The first EML 412 would receive the first electrical signal which is the biased first baseband signal and be modulated by the first electrical signal to output a second laser beam having a second wavelength $\lambda_1$. The second EML 414 would receive the second electrical signal which is the DC biased second baseband signal and be modulated by the second electrical signal to output a third laser beam having a third wavelength $\lambda_2$. The second optical coupler 416 which is coupled to the first EML 412 and the second EML 414 would receive the second laser beam and the third laser beam and transmit a combined optical signal. The first optical coupler 415 which is coupled to the laser source 417 and the second optical coupler would receive the combined optical signal and the first laser beam generated by the laser source 417 and having a first wavelength $\lambda$ and transmit an output laser beam to be transmitted to the RAP 402 via a fiber optical connection. As shown in subplot 422 of FIG. 2B, the output laser beam may include not limited to a first carrier frequency $f_{RF1}$ which is determined from a difference between $\lambda$ and $\lambda_1$ as well as a second carrier frequency $f_{RF2}$ which is determined from a difference between $\Delta$ and $\lambda_2$.

It is worth noting that the second OC 416 could be synonymous with an optical combiner. Similarly, the second OC 416 may also be a coupler that includes an optical combiner. Alternative to the exemplary embodiment of FIG. 2A, the second OC 416 might not be necessary as the first OC 415 alone would be able to receive the output laser beams of the first EML 412 and the second EML 414 and the laser source 417 to generate the output laser beam as previously described.

As for the RAP 402, the optical splitter 420 would receive an input optical signal from the fiber optical connection and splits the input optical signal into the first optical signal and the second optical signal. The first interleaver 418 which is connected to the optical splitter 420 would receive the first optical signal and eliminates the second carrier frequency having the third wavelength $\lambda_2$ from the first optical signal. The output of the first interleaver 418 is shown in subplot 423 of FIG. 2B. Similarly, the second interleaver 419 which is connected to the optical splitter 420 would receive the second optical signal and eliminates the first carrier frequency having the second wavelength $\lambda_1$ from the second optical signal. The output of the second interleaver 419 is shown in subplot 424 of FIG. 2B. The PD1 would convert the optical output of the first interleaver 418 into a first RF signal having the first carrier frequency $f_{RF1}$ and similarly the PD2 would convert the optical output of the second interleaver 419 into a second RF signal having the second carrier frequency $f_{RF2}$. An example of the first RF signal is shown in subplot 425 and the second RF signal is shown in subplot 426. The first RF signal and the second RF signal could be transmitted wirelessly to the UE 403 via the same or two different wireless transmitters. It is worth noting that the first interleaver 418 and the second interleaver 409 could also be implemented by other optical devices such as optical filters as long as the optical devices may serve the function of selectively transmitting optical transmissions of different wavelengths.

As the first RF signal is received by the first wireless receiver of the first wireless UE of the one or more UE terminals 403, the first power detector would convert the first RF signal into a third baseband signal as shown in subplot 427 of FIG. 2B. The third baseband signal would ideally be the first baseband signal recovered by the first wireless UE. For this disclosure, a RF signal could be down converted directly into a baseband signal since the RF signal is intensity modulated. Similarly, as the second RF signal is received by the second wireless receiver of the second wireless UE, the second power detector would convert the second RF signal into a fourth baseband signal which is ideally the second baseband signal recovered. Thus, the second baseband signal could be received by the second wireless UE.

Figure 3A:
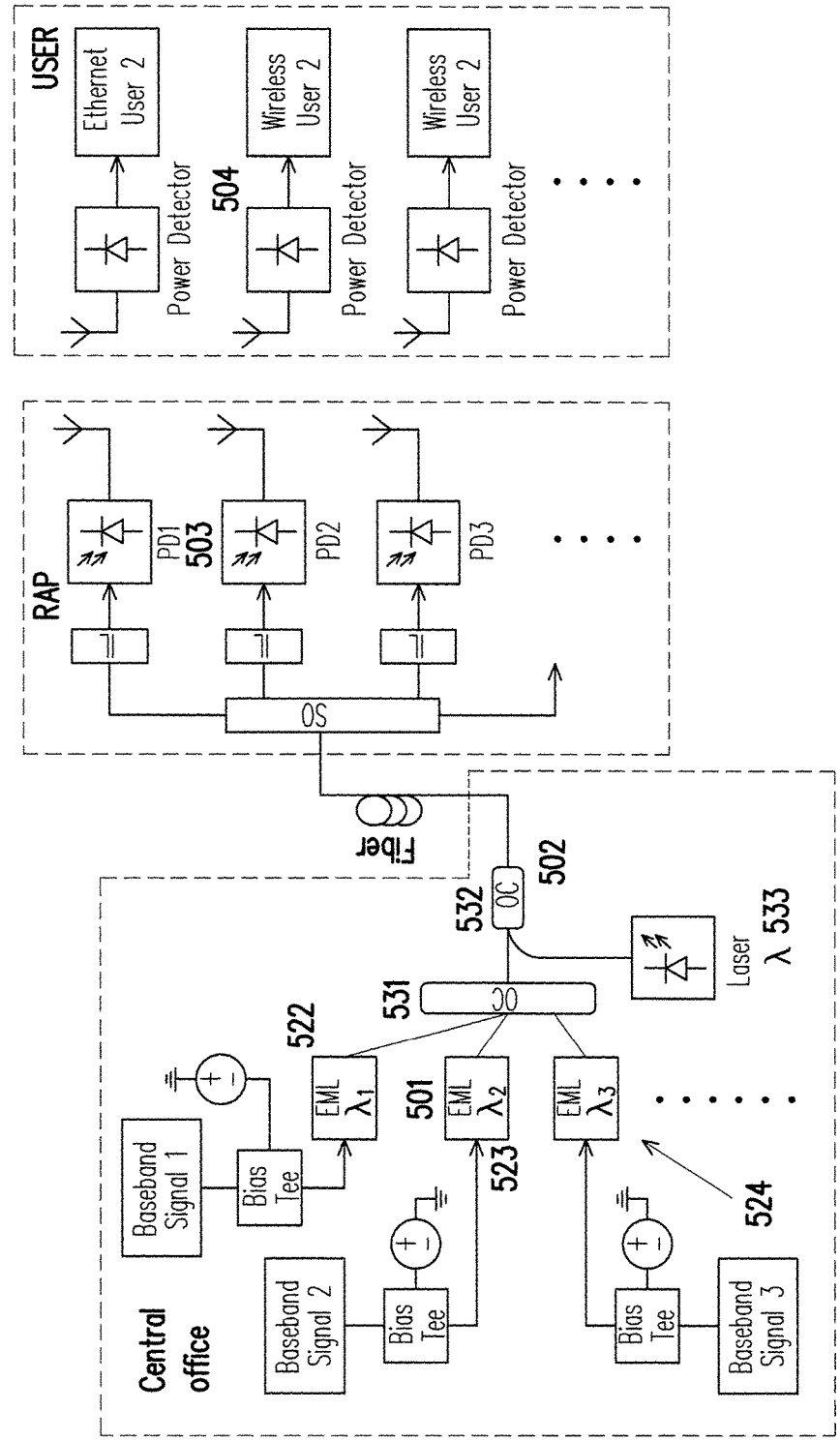
FIGS. 3A & 3B illustrate an exemplary RoF communication system in accordance with a third exemplary embodiment of the disclosure.
Figure 3B:
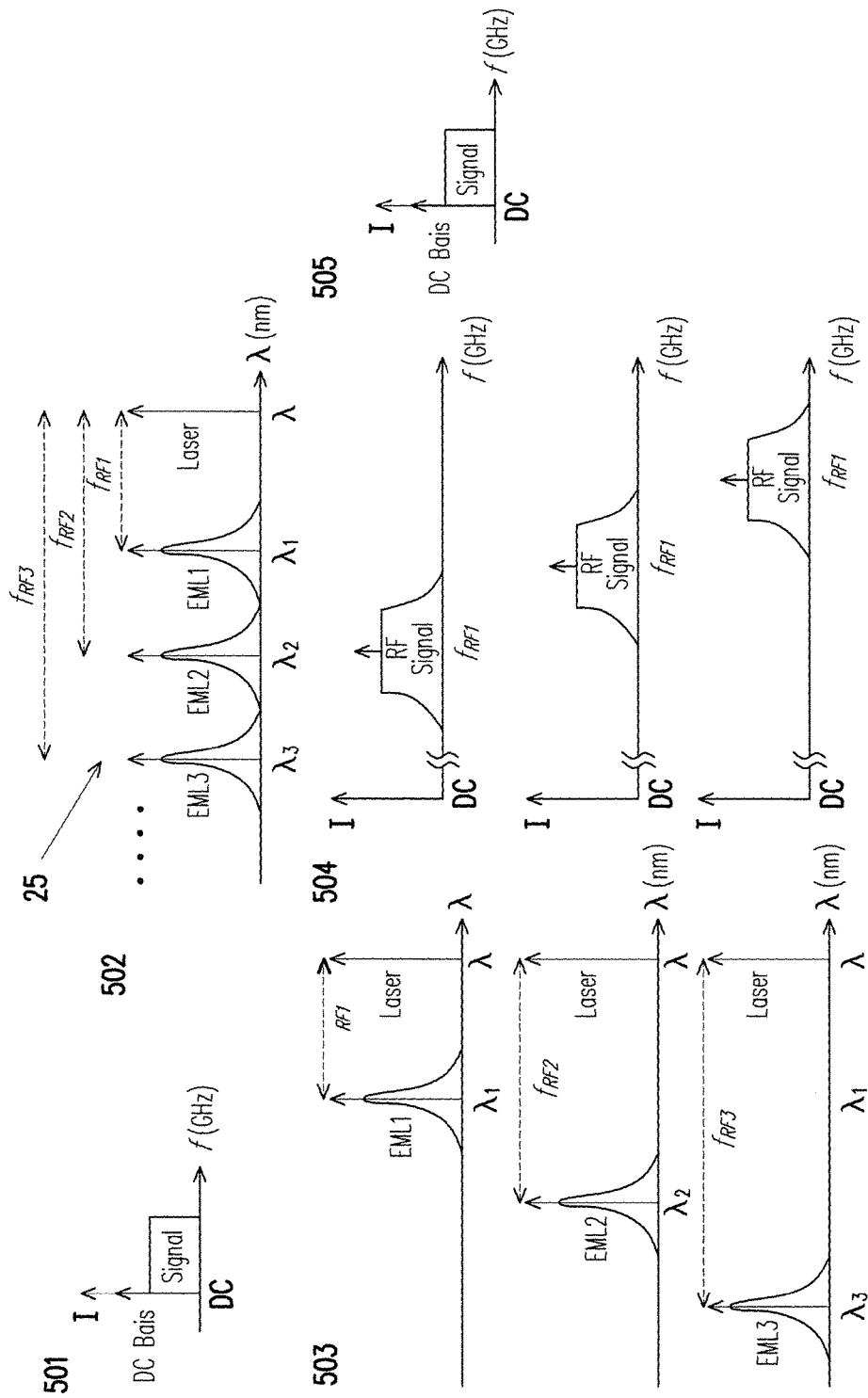

FIGS. 3A & 3B illustrates an exemplary RoF communication system in accordance with a third exemplary embodiment of the disclosure. The third exemplary embodiment is similar to FIGS. 2A & 2B but shows that the second exemplary embodiment would not be limited to two operating frequency bands but more than two EMLs could be utilized to transmit signals in multiple optical spectrums. In order to operate in multiple optical spectrums, for instance, each of the EMLs including not limited to 522 523 524 may receive a different DC biased baseband signal such as the one shown in subplot 501 of FIG. 3B. The first optical coupler 531 would combine multiple laser beams modulated by the multiple EMLs to generate a combined optical signal. Based on the differences in wavelengths among the wavelength t of the laser beam 533 and the combined optical signal, the second optical coupler 532 would generate an output optical signal having multiple carrier frequencies not limited to $f_{RF1}$ $f_{RF2}$ $f_{RF3}$ based on the differences of $\Delta$ and $\lambda_1$, $\lambda$ and $\lambda_2$, and $\lambda$ and $\lambda_3$, respectively as shown in subplot 502. The output optical signal would be transmitted over a fiber optical cable and reach an optical splitter of a RAP which would split the received optical signal into multiple optical signals. Each of the interleaver would filter out undesired signals from other optical spectrums and subsequently, each of the PDs convert optical signals of the interleavers into RF electrical signals. Subplot 503 shows an example of the output of the interleavers and subplot 504 shows an example of the output of the PDs. The RF electrical signals would subsequently be transmitted to individual user equipments. Each of the user equipments would be able to frequency down convert a RF signal into a baseband signal by using a power detector without the use of a local oscillator and a mixer. Subplot 505 shows an example of a baseband signal recovered from a power detector.

Figure 4A:
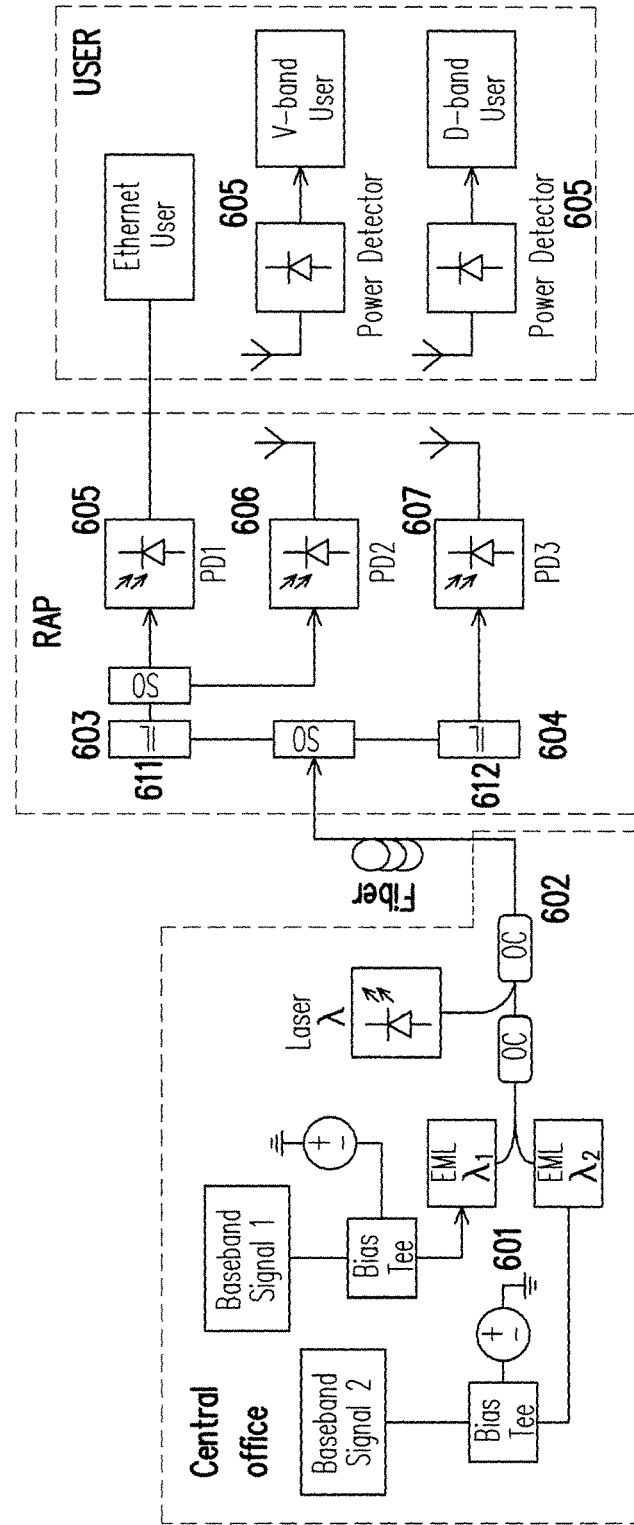
FIGS. 4A & 4B illustrate an exemplary RoF communication system in accordance with a fourth exemplary embodiment of the disclosure.
Figure 4B:
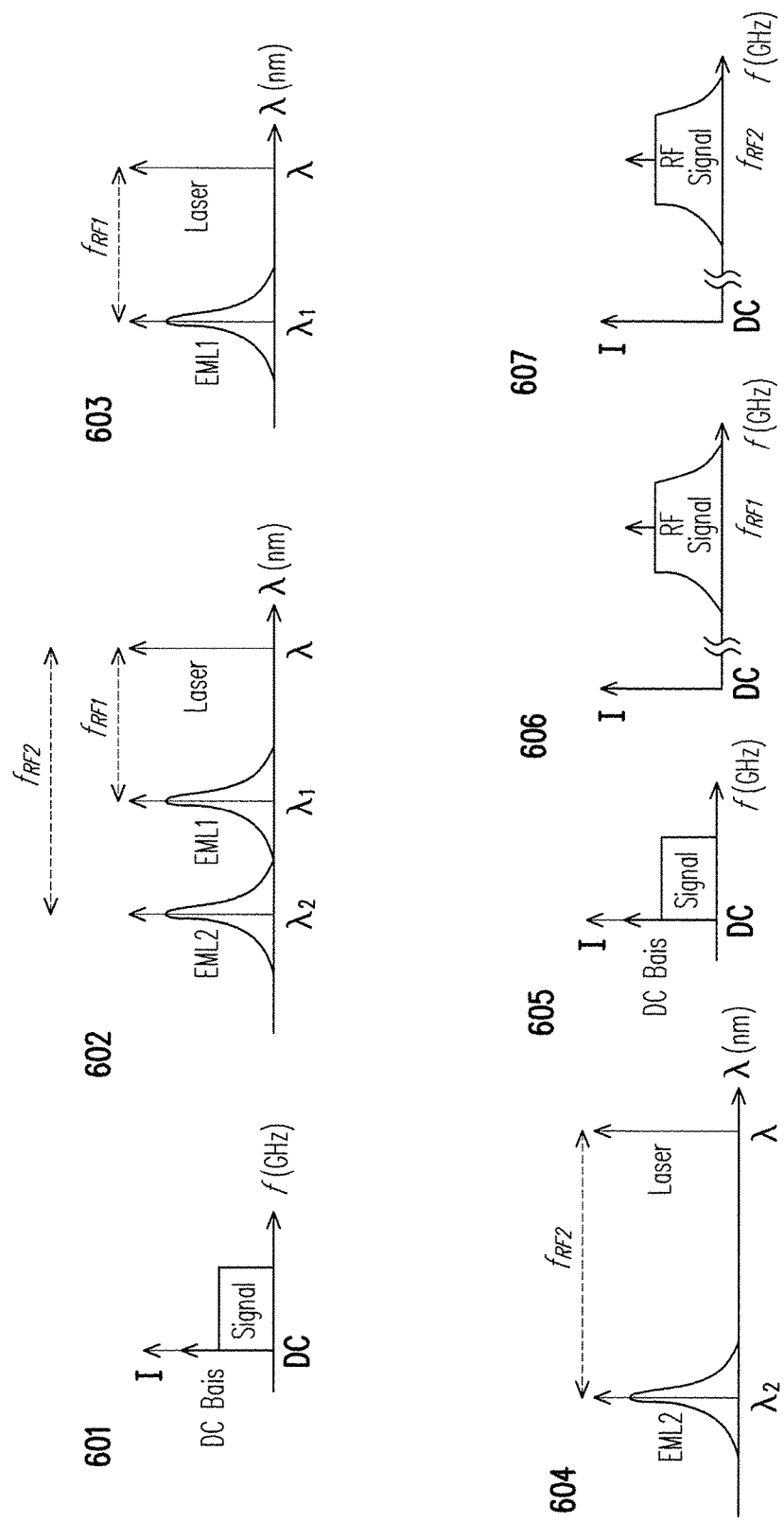

FIGS. 4A & 4B illustrates an exemplary RoF communication system in accordance with a fourth exemplary embodiment of the disclosure. Since the structure of the network node or Central Office is similar to FIG. 2, a repetition of written description would be spared. Subplot 601 shows an example of one of the baseband signals, subplot 602 shows that the Central Office may generate multiple carrier frequencies, $f_{RF1}$ and $f_{RF2}$ based on the wavelengths differences of $\lambda$ and $\lambda_1$ and $\lambda$ and $\lambda_2$ respectively. Subplots 603 shows an example of using a first optical splitter and an interleaver 611 to derive carrier frequency $f_{RF1}$, and Subplots 604 shows an example of using a first optical splitter and another interleaver 612 to derive carrier frequency $f_{RF2}$.

One unique aspect of the fourth exemplary embodiment of FIG. 4 is that a second optical splitter 614 could be utilized to split the optical signal from the output of the first interleaver 611. Since the output of the first interleaver 611 may contain a baseband component and a RF component, the two splitted optical signals could be sent to a first photodetector (PD1) which frequency down converts one of the output of the second optical splitter 614 into a baseband signal which is shown in subplot 605 as an example and also a second photodetector (PD2) which frequency down converts the other one of the output of the second optical splitter 614 into a RF signal having carrier frequency $f_{RF1}$ which is shown in subplot 606 as an example. The baseband signal could then be transmitter to a first UE via an Ethernet connection. The RF signal having carrier frequency $f_{RF1}$ could be transmitted wirelessly to a second UE. As shown in FIG. 4, the second UE which could be a V-band UE may use a power detector to frequency down converts the RF signal having carrier frequency $f_{RF1}$ into a V-band signal. A third photodetector (PD3) could be used to frequency down converts the output of the second interleaver 612 into a RF signal having carrier frequency $f_{RF2}$ as shown in subplot 607 as an example. The RF signal having carrier frequency $f_{RF2}$ could then be transmitted wirelessly to a third UE which could a UE that uses E-band. The third UE could then use a power detector to frequency down convert the RF signal having carrier frequency $f_{RF2}$ into an E-band signal.

Figure 5:
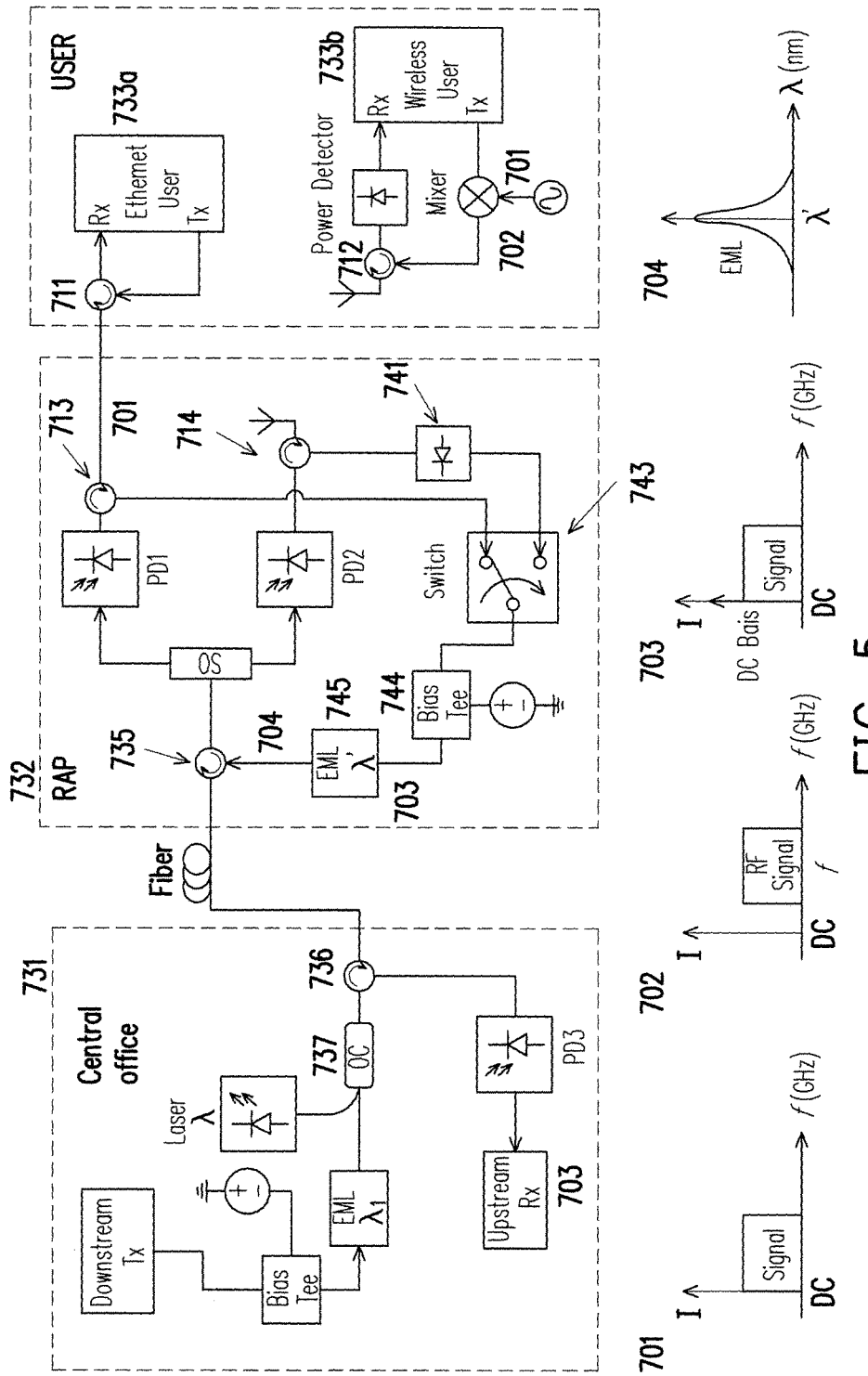
FIG. 5 illustrates an exemplary RoF communication system in accordance with a fifth exemplary embodiment of the disclosure.

FIG. 5 illustrates an exemplary RoF communication system in accordance with a fifth exemplary embodiment of the disclosure. The principle of operation of the downlink path of fifth exemplary embodiment is similar to previous exemplary embodiments but the fifth exemplary embodiment introduces an uplink path which shares communication links (e.g. optical, wireless, Ethernet) so as to greatly reduce the hardware costs of constructing such RoF communication system. In this exemplary embodiment, a first UE 733a which could be an Ethernet user may transmit a first electrical signal in the uplink path to a first electrical circulator 711 which provides isolation from the downlink path. The first electrical signal could be a baseband signal shown in subplot 701 as an example and transmitted to the RAP 732 via an Ethernet connection. The first electrical could then be received by the RAP 732 via a third electrical circulator 713 which provides isolation from the output of the first photodetector (PD1). A second UE 733b which could be a wireless user may transmit a baseband signal, as shown in subplot 701 as an example, to a mixer to frequency up conversion. The frequency up converted RF signal is as shown in subplot 702 as an example. The up converted RF signal could then be transmitted to the RAP 732 via a second electrical circulator 712. It is worth noting that the first electrical circulator 711, the second electrical circulator 712, and the third electrical circulator 713 could be implemented by electrical devices such as a duplexer as long as such electrical devices could implement the function of providing multi-directional transmissions.

As the RF signal is received by the RAP 732, the RF signal would be sent to a power detector 741 for down conversion via a fourth electrical circulator 714 which provide isolation from the second photodetector (PD2). The power detector 741 would generate a down converted second electrical signal. The RAP 732 may include a switch 743 which would connect the first electrical signal or the down converted second electrical signal to the Bias Tee 744 which performs DC biasing in order to for the first electrical signal or the down converted second electrical signal to have the proper voltage range. The output of the Bias Tee is shown in subplot 703 as an example. The EML 745 would receive the output of the Bias Tee and modulate a laser beam of wavelength $\lambda'$. The optical spectrum of the modulated laser beam of wavelength $\lambda'$ is shown in subplot 704. The laser beam of wavelength $\lambda'$ would then be sent to an fiber optical connection destined toward the Central Office 731 via a first optical circulator 735 which provides isolation from the downlink path. Notice that the uplink path and the downlink path would share the same fiber optical connection and thus reduce the cost of long distance transmission.

As the Central Office 731 receives the optical transmission from the RAP 732, the received optical transmission is sent through a second optical circulator 736 which provides isolation from the downlink path, namely, the output of the optical coupler 737. The received optical transmission is then converted into an electrical signal which could then be further transmitted upstream.

Figure 6:
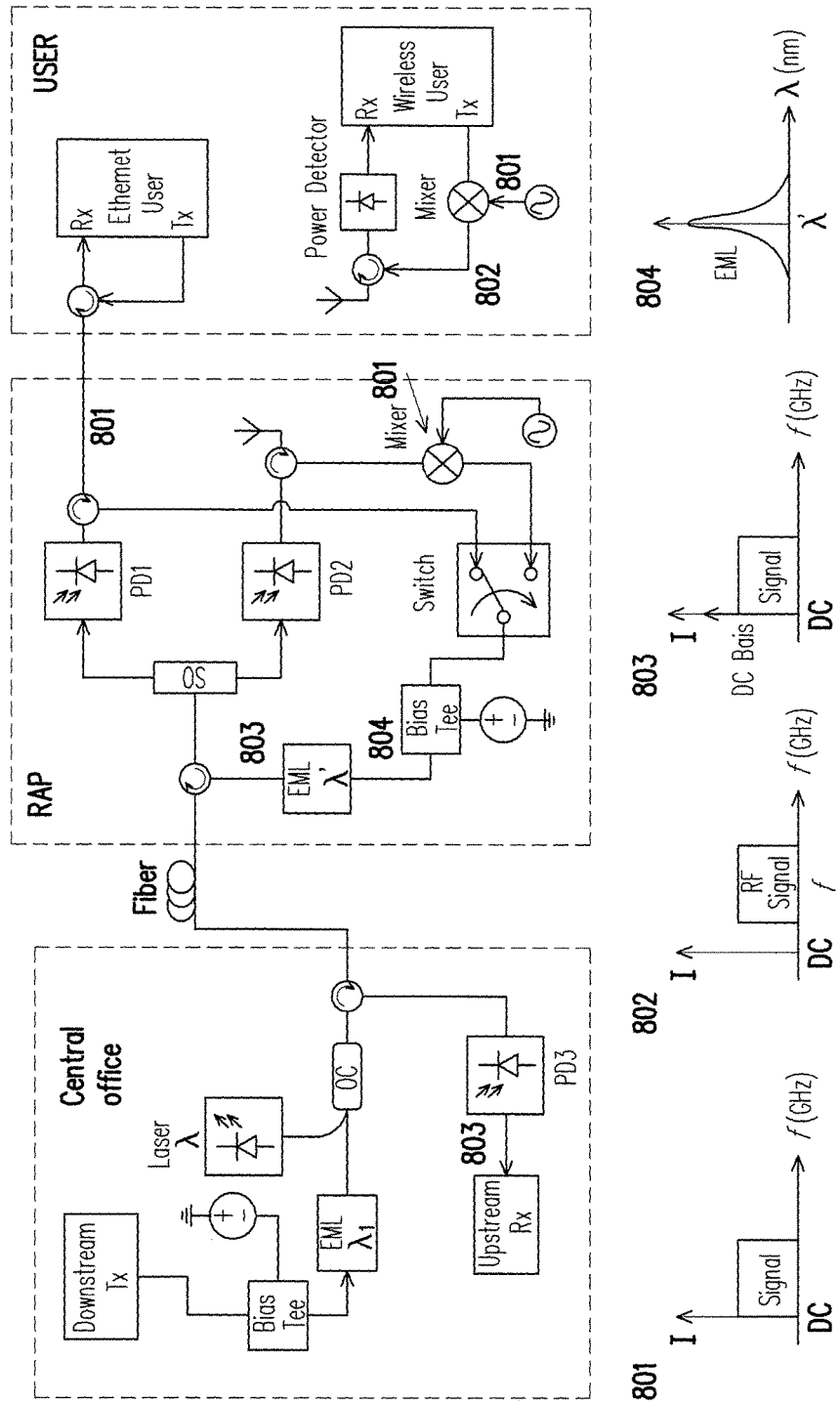
FIG. 6 illustrates an exemplary RoF communication system in accordance with a sixth exemplary embodiment of the disclosure.

FIG. 6 illustrates an exemplary RoF communication system in accordance with a sixth exemplary embodiment of the disclosure. The sixth exemplary embodiment discloses a RoF communication system simultaneously supporting with a UE that uses an Ethernet connection and a UE that uses a wireless connection in the uplink path. The sixth exemplary embodiment is nearly identical to the fifth exemplary embodiment of FIG. 5 except that a mixer is used instead of the power detector 741. A mixer and a local oscillator could also be used if necessary in order to perform frequency down conversion from a RF signal into a lower frequency signal. Subplot 801 as an example shows a waveform of a baseband signal. Subplot 802 as an example shows a frequency spectrum as the result of frequency up conversion by using a mixer. Subplot 803 as an example shows a frequency spectrum as the result of frequency down conversion by using a mixer or a power detector and DC biasing by a Bias Tee. Subplot 804 as an example shows an optical spectrum as the result of electro-optical conversion by using the EML.

Figure 7:
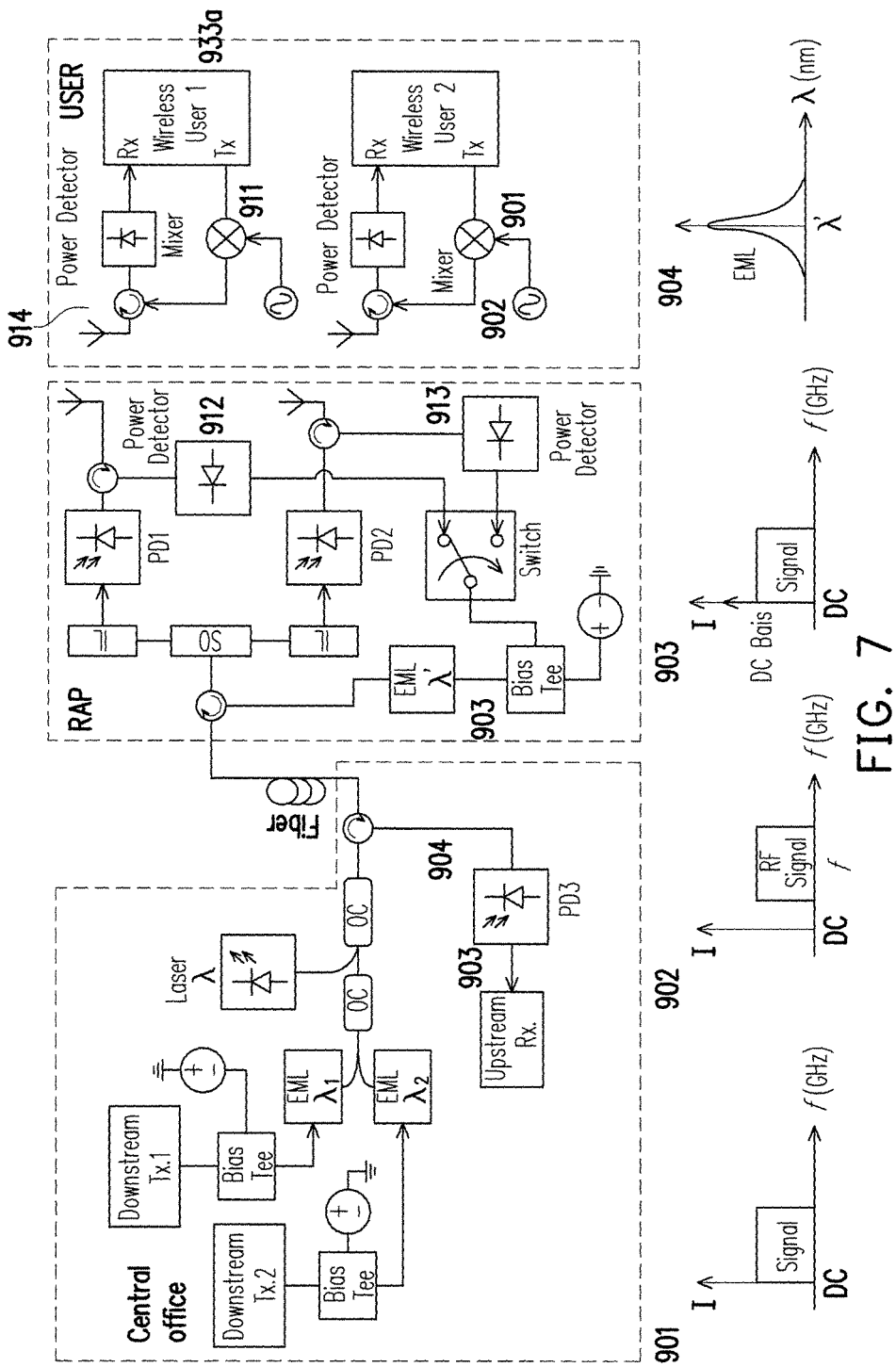
FIG. 7 illustrates an exemplary RoF communication system in accordance with a seventh exemplary embodiment of the disclosure.

FIG. 7 illustrates an exemplary RoF communication system in accordance with a seventh exemplary embodiment of the disclosure. The seventh exemplary embodiment discloses a RoF communication system simultaneously supporting at least two UEs that uses wireless connections in the uplink path. The sixth exemplary embodiment is similar to previously disclosed exemplary embodiments but since the first UE 933a uses a wireless connection, a mixer 911 could be utilized for down conversion and subsequently an electrical circulator 914 could be used for isolation. In the RAP, power detectors 912 913 could be used to directly frequency down convert RF signals into baseband signals in order to be modulated into optical signals by EML for uplink transmission. Subplot 901 as an example shows a frequency spectrum of a baseband signal. Subplot 902 as an example shows a frequency spectrum as the result of frequency up conversion by using a mixer. Subplot 903 as an example shows a frequency spectrum as the result of frequency down conversion by using a mixer or a power detector and DC biasing by a Bias Tee. Subplot 904 as an example shows an optical spectrum as the result of electro-optical conversion by using the EML.

Figure 8:
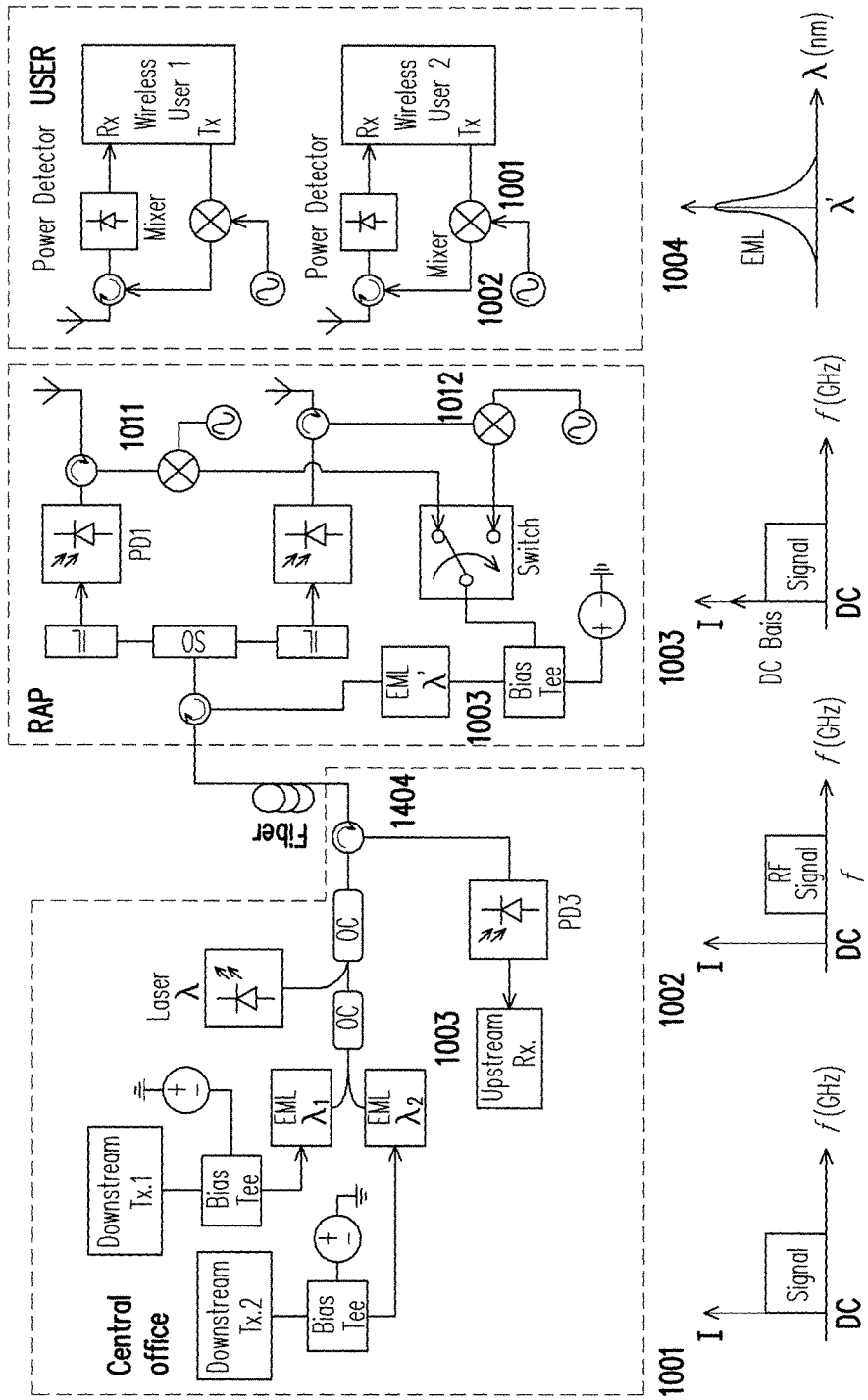
FIG. 8 illustrates an exemplary RoF communication system in accordance with an eighth exemplary embodiment of the disclosure.

FIG. 8 illustrates an exemplary RoF communication system in accordance with an eighth exemplary embodiment of the disclosure. The eight exemplary embodiment is nearly identical to the seventh exemplary embodiment except that mixers 1011 1012 are used instead of the power detectors 912 913. Mixer 1011 1012 local oscillators could also be used if necessary in order to perform frequency down conversion from RF signals into baseband signals. Subplot 1001 as an example shows a frequency spectrum of a baseband signal. Subplot 1002 as an example shows a frequency spectrum as the result of frequency up conversion by using a mixer. Subplot 1003 as an example shows a frequency spectrum as the result of frequency down conversion by using a mixer or a power detector and DC biasing by a Bias Tee. Subplot 1004 as an example shows an optical spectrum as the result of electro-optical conversion by using the EML.

Figure 9A:
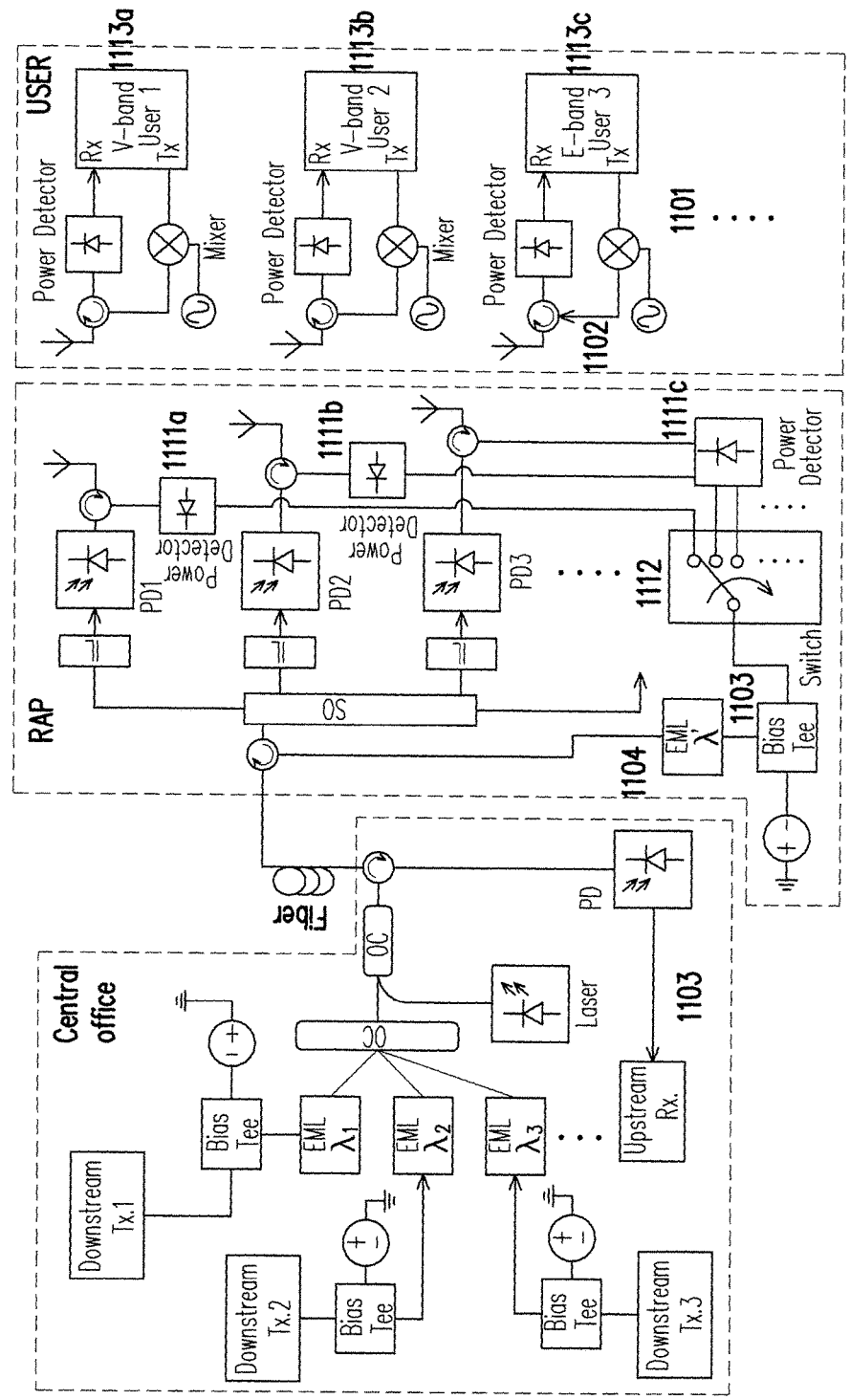
FIGS. 9A & 9B illustrate an exemplary RoF communication system in accordance with a ninth exemplary embodiment of the disclosure.
Figure 9B:
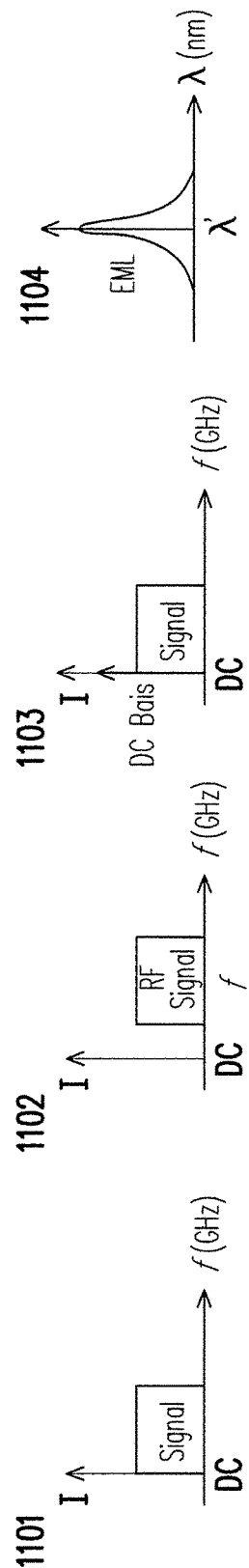

FIGS. 9A & 9B illustrates an exemplary RoF communication system in accordance with a ninth exemplary embodiment of the disclosure. The ninth exemplary embodiment is similar to the seventh exemplary embodiment of FIG. 9 but more than two UEs could be supported by the RoF communication system. For instance, the RoF communication system not limited to a first UE 1113a that is assumed to use the V-band, a second UE 1113b that is assumed to use the V-band, and a third UE 1113c that is assumed to use the E-band. In the downlink path, the number of EMLs would determine how many different frequency spectrums are to be utilized, and in the uplink path, the switch may switch among different users so that all the users would be able to share the same fiber optical connection. In the uplink path, each of the UEs 1113a 1113b 1113c may contain mixers for frequency up conversions into RF signals, and subsequently upon receiving the RF signals, the RAP may utilize power detectors 1111a 1111b 1111c for frequency down conversion into baseband signals. The switch 1112 would then send one of the baseband signals through to be modulated into a modulated laser beam by the EML. Subplot 1101 as an example shows a waveform of a baseband signal. Subplot 1102 as an example shows a frequency spectrum as the result of frequency up conversion by using a mixer. Subplot 1103 as an example shows a frequency spectrum as the result of frequency down conversion by using a mixer or a power detector and DC biasing by a Bias Tee. Subplot 1104 as an example shows an optical spectrum as the result of electro-optical conversion by using the EML.

Figure 10A:
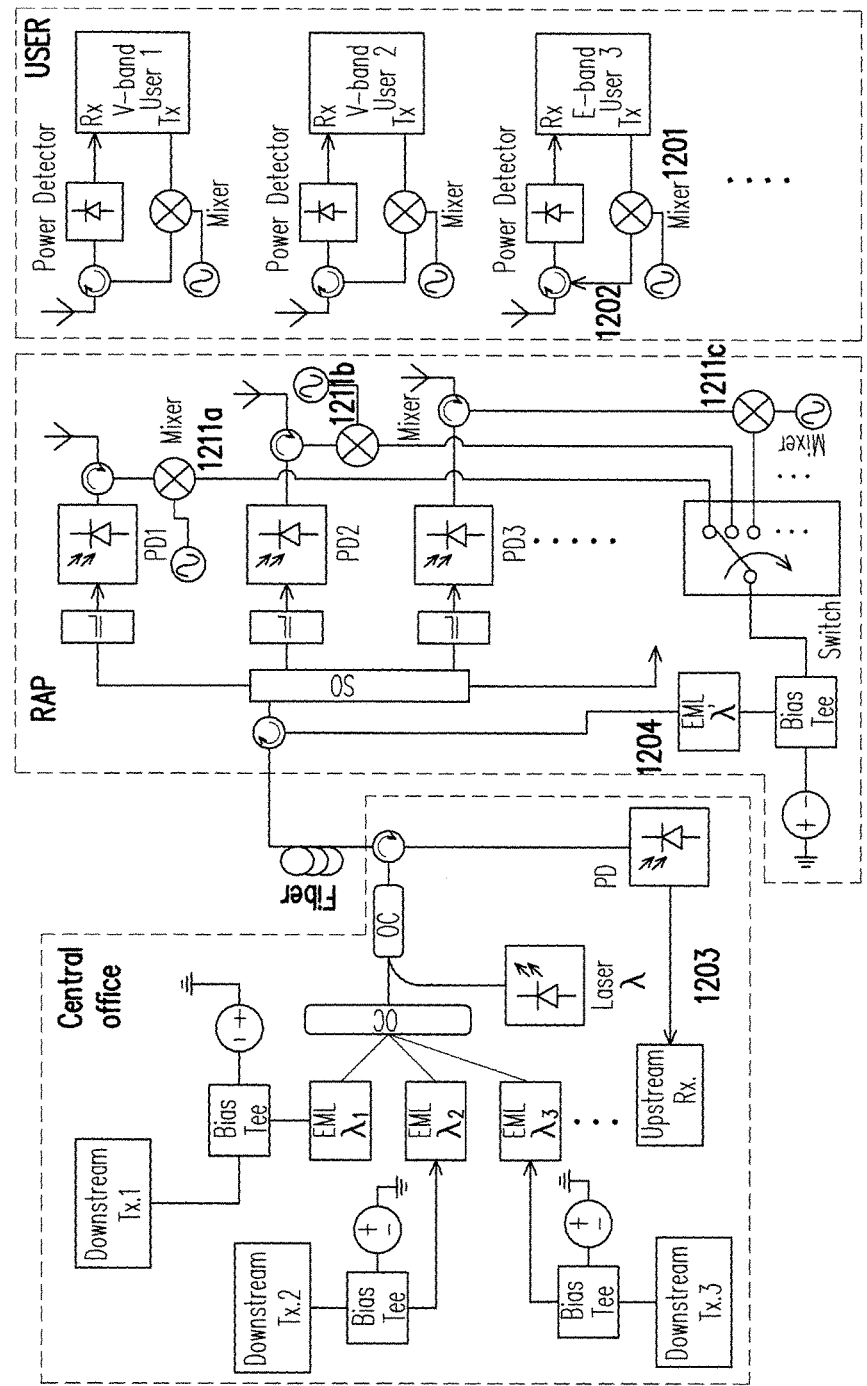
FIGS. 10A & 10B illustrate an exemplary RoF communication system in accordance with a tenth exemplary embodiment of the disclosure.
Figure 10B:
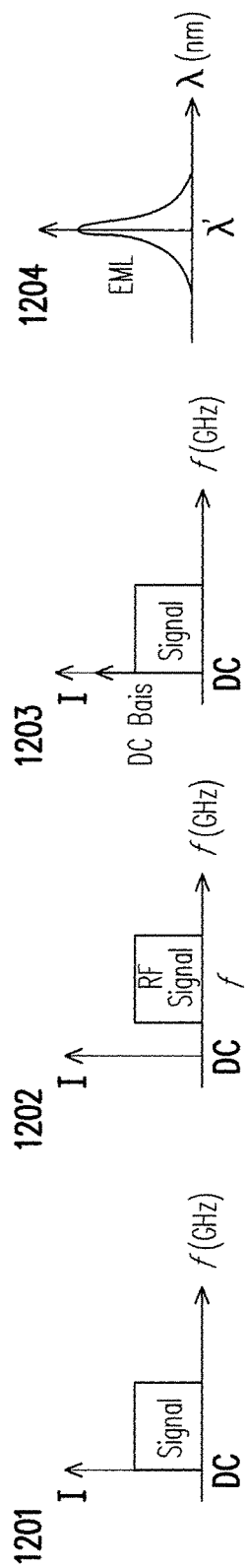

FIGS. 10A & 10B illustrates an exemplary RoF communication system in accordance with a tenth exemplary embodiment of the disclosure. The tenth exemplary embodiment is nearly identical to the ninth exemplary embodiment except that a mixers 1211a 1211b 1211c are used instead of the power detectors 1111a 1111b 1111c. Mixer 1211a 1211b 1211c and local oscillators could also be used if necessary in order to perform frequency down conversion from RF signals into baseband signals. Subplot 1201 as an example shows a frequency spectrum of a baseband signal. Subplot 1202 as an example shows a frequency spectrum as the result of frequency up conversion by using a mixer. Subplot 1203 as an example shows a frequency spectrum as the result of frequency down conversion by using a mixer or a power detector and DC biasing by a Bias Tee. Subplot 1204 as an example shows an optical spectrum as the result of electro-optical conversion by using the EML.

Figure 11:
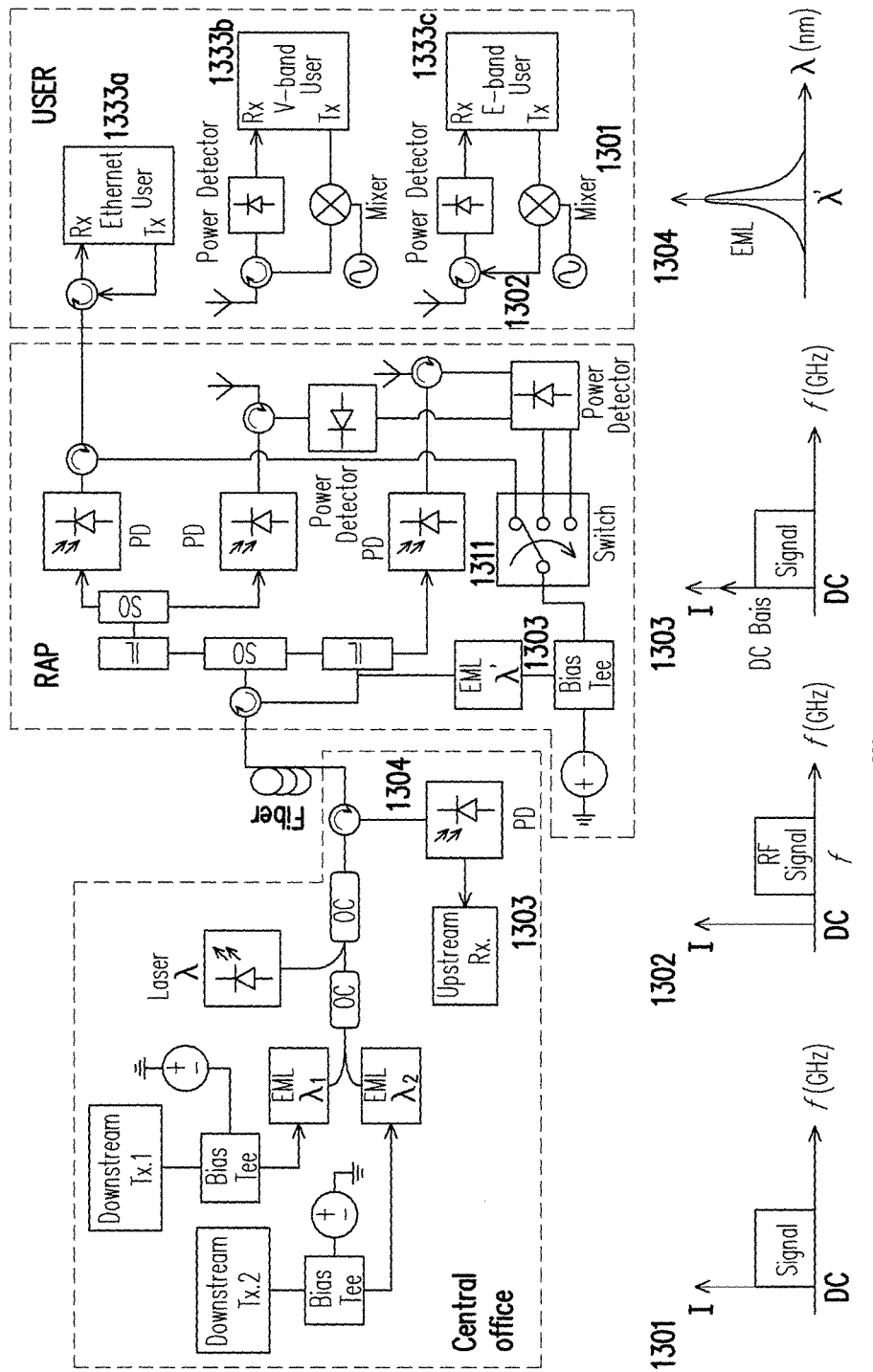
FIG. 11 illustrates an exemplary RoF communication system in accordance with an eleventh exemplary embodiment of the disclosure.

FIG. 11 illustrates an exemplary RoF communication system in accordance with an eleventh exemplary embodiment of the disclosure. The eleventh exemplary embodiment is similar to previously presented exemplary embodiments, but the proposed RoF communication system would be able to support multiple UEs that use Ethernet communications as well as RF communications. As shown in FIG. 11, for example, the first UE 1333a may connect to the RAP by using an Ethernet connection, the second UE 1333b may use the V-band, and the third UE 1333c may use the E-band. The structure of the first UE 1333a may include an Ethernet transceiver (not shown) and an electrical circulator which provides isolations between the uplink path and the downlink path. The second UE 1333b may contain at least one mixer for frequency up conversion from the baseband to V-band frequency and also may contain an electrical circulator which provides isolations between the uplink path and the downlink path which may utilize a power detector for frequency down conversion. The second UE 1333c may contain at least one mixer for frequency up conversion from the baseband frequency to E-band frequency and also may contain an electrical circulator which provides isolations between the uplink path and the downlink path which may utilize a power detector for frequency down conversion.

As for the RAP, power detectors could be used to frequency down convert from RF frequencies to basebands, and electrical circulators would also be used for isolation between the uplink path and downlink path. The Switch 1311 could be used to switch among three or more baseband signals which would subsequently be DC biased by a Bias Tee and sent to an EML to be modulated as a modulated laser beam. In this way, multiple UEs could share the same set of hardware which includes not limited to a Switch 1311, a Bias Tee, an EML laser, the same Fiber optical connection, and so forth. Subplot 1301 as an example shows a frequency spectrum of a baseband signal. Subplot 1302 as an example shows a frequency spectrum as the result of frequency up conversion by using a mixer. Subplot 1303 as an example shows a frequency spectrum as the result of frequency down conversion by using a mixer or a power detector and DC biasing by a Bias Tee. Subplot 1304 as an example shows an optical spectrum as the result of electro-optical conversion by using the EML.

Figure 12:
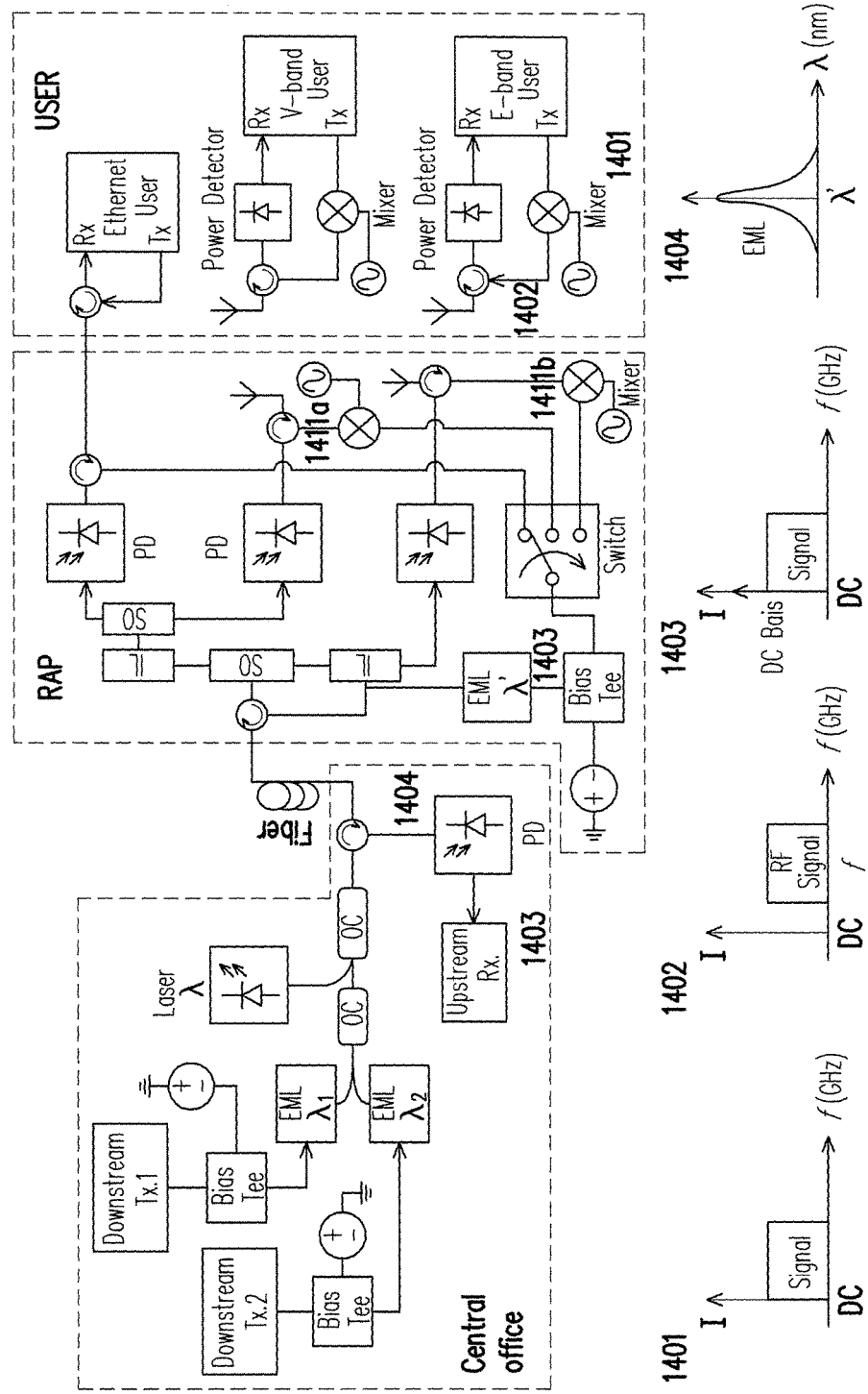
FIG. 12 illustrates an exemplary RoF communication system in accordance with a twelfth exemplary embodiment of the disclosure.

FIG. 12 illustrates an exemplary RoF communication system in accordance with a twelfth exemplary embodiment of the disclosure. The twelfth exemplary embodiment is nearly identical to the eleventh exemplary embodiment except that mixers 1411a 1411b are used instead of the power detectors. Mixers 1411a 1411b and local oscillators could also be used if necessary in order to perform frequency down conversion from RF signals into baseband signals. Subplot 1401 as an example shows a frequency spectrum of a baseband signal. Subplot 1402 as an example shows a frequency spectrum as the result of frequency up conversion by using a mixer. Subplot 1403 as an example shows a frequency spectrum as the result of frequency down conversion by using a mixer or a power detector and DC biasing by a Bias Tee. Subplot 1404 as an example shows an optical spectrum as the result of electro-optical conversion by using the EML.

In view of the aforementioned embodiments, the disclosure proposes a low cost and easy to integrate RoF communication system. The aims of the proposed RoF communication system would include decreasing the costs and complexity involved to generate millimeter wave and terahertz wave high frequency signals as well as optical signals. In order to generate a high frequency signal, existing communication systems may typically use a mixer to mix a baseband signal with a high frequency signal generated by a local oscillator. However, generating the above described high frequency signal to operate in millimeter wave or terahertz wave would greatly increase the cost and complexity of such communication system. In order to decrease the cost and complexity as well as to increase the ease of integration, the disclosure proposes a multiband RoF communication system which has been described in various embodiments of the disclosure.

The proposed RoF network node, base station, and communication system contains various advantages stated at least as follows: (1) The overall cost may be reduced and the ease of integration may be increased by using EMLs instead of other types of lasers. (2) By using laser sources to generate millimeter wave or terahertz wave without high frequency mixers and local oscillators, the design complexity as well as costs to build such system could be greatly reduced. (3) By using EML lasers of different wavelengths, the RoF communication system could be designed to operate in multiple frequency spectrums. (4) The frequency down conversion accomplished via power detectors may reduce or eliminate the use of mixers and local oscillators and thus the cost and complexity of building such a system could be reduced. (5) The use of optical circulators may reduce the cost of long distance transmission.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A radio over fiber (RoF) network node comprising:
    a laser source which transmits a first laser beam having a first wavelength;
    a first Electroabsorption Modulated Laser (EML) which transmits a second laser beam having a second wavelength that is modulated by a first electrical signal;
    a second EML which transmits a third laser beam having a third wavelength that is modulated by a second electrical signal;
    a first optical coupler which is coupled to the laser source and the first EML, directly combines the first laser beam and a combined optical signal of the second laser beam and the third laser beam into an output laser beam, and transmits the output laser beam having a first carrier frequency and a second carrier frequency, where the first carrier frequency is determined based on a wavelength difference between the first wavelength and the second wavelength, and the second carrier frequency is determined based on a wavelength difference between the first wavelength and the third wavelength; and
    a second optical coupler which is coupled to the first EML and the second EML and outputs the combined optical signal by directly combining the second laser beam and the third laser beam.

2. The RoF network node of claim 1 further comprising:
    a third EML which modulates a third electrical signal into a fourth laser beam that is modulated and has a fourth wavelength; and wherein the second optical coupler further receives the fourth laser beam and the output laser beam which further comprises a third carrier frequency which is determined based on a wavelength difference between the first wavelength and the fourth wavelength.

3. The RoF network node of claim 1 further comprising:
    an optical circulator which receives an input optical signal and provides isolation for the output laser beam from the first optical coupler;
    a first photodetector which is connected to the optical circulator and converts the input optical signal into a fourth electrical signal; and
    an uplink transmitter which transmits the fourth electrical signal in an uplink path.

4. The RoF network node of claim 1 further comprising:
    a bias tee which receives a first baseband signal and performs direct current (DC) biasing on the first baseband signal to generate the first electrical signal in order for the first electrical signal to have full dynamic range for the first EML.

5. A Radio Access Point (RAP) comprising:
    A first optical splitter which receives an input optical signal and divides the input optical signal into a first optical signal and a second optical signal;
    a first photodetector which is coupled to the first optical splitter, receives the first optical signal, and converts the first optical signal into a first electrical signal;

a second photodetector which is coupled to the first optical splitter, receives the second optical signal, and converts the second optical signal into a second electrical signal, wherein the first electrical signal and the second electrical signal are derived from the input optical signal;

a first electrical circular which is coupled to the first photodetector and provides isolation from the first electrical signal and a first uplink signal based on the first electrical signal;

a second electrical circular which is coupled to the second photodetector and provides isolation from the second electrical signal and a second uplink signal based on the second electrical signal;

a switch which selects one of the first and second uplink signals;

an Electroabsorption Modulated Laser (EML) which is coupled to the switch and receives an one of the first and second uplink signals based on the first electrical signal or the second electrical signal and modulates into a laser beam; and a first optical circulator which is connected to the EML and the first optical splitter, receives the laser beam, and provides the laser beam isolation from the input optical signal.

6. The Radio Access Point (RAP) of claim 5, wherein the first electrical signal is a first base band signal which is transmitted via a wired or cabled network connection, and the second electrical signal is a first RF signal which is transmitted via an antenna.

7. The Radio Access Point (RAP) of claim 5, wherein the input optical signal comprises a first carrier frequency and a second carrier frequency, claim 5 further comprising:

a first interleaver which is connected to the first optical splitter, receives the first optical signal and eliminates the second carrier frequency from the first optical signal; and a second interleaver which is connected to the first optical splitter, receives the second optical signal and eliminates the first carrier frequency from the second optical signal.

8. The Radio Access Point (RAP) of claim 7, wherein the input optical signal further comprises a third carrier frequency, claim 7 further comprising:

a third interleaver which is connected to the first optical splitter, receives a third optical signal and eliminates the first carrier frequency and the second carrier frequency from the third optical signal; and a third photodetector which is connected to the first optical splitter, receives the third optical signal, and converts the third optical signal into a third electrical signal.

9. The Radio Access Point (RAP) of claim 7 further comprising:

a second optical splitter which is connected to the first interleaver and transmits the first optical signal to the first photodetector and a third optical signal to the third photodetector, wherein the first photodetector recovers a baseband signal and the third photodetector recovers a RF signal.

10. The Radio Access Point (RAP) of claim 5 further comprising:

a fourth power detector which down converts the second electrical signal to generate a down converted second electrical signal, wherein the first uplink signal is provided by a first power detector, the second uplink signal is provided by a second power detector, and the switch connects the first electrical signal or the down converted second electrical signal to a bias tee.

11. The Radio Access Point (RAP) of claim 10, wherein the bias tee performs direct current (DC) biasing for the first electrical signal or the second electrical signal to generate an uplink signal based on the first electrical signal or the second electrical signal in order for the uplink signal to have full dynamic range for the EML.

12. The Radio Access Point (RAP) of claim 5 further comprising:

a fifth power detector which down converts the first electrical signal to generate a down converted first electrical signal; and a fourth power detector which down converts the second electrical signal to generate a down converted second electrical signal, wherein the first uplink signal is provided by a first power detector, the second uplink signal is provided by a second power detector, and the switch connects the down converted first electrical signal or the down converted second electrical signal to a bias tee.

13. A Radio over Fiber (RoF) communication system comprising:

a network node comprising:

a laser source which transmits a first laser beam having a first wavelength;

a first Electroabsorption Modulated Laser (EML) which transmits a second laser beam having a second wavelength that is modulated by a first electrical signal;

a second EML which transmits a third laser beam having a third wavelength that is modulated by a second electrical signal; and a first optical coupler which is coupled to the laser source and the first EML, directly combines the first laser beam and a combined optical signal of the second laser beam and the third laser beam into an output laser beam, and transmits the output laser beam having a first carrier frequency and a second carrier frequency, where the first carrier frequency is determined based on a wavelength difference between the first wavelength and the second wavelength, and the second carrier frequency is determined based on a wavelength difference between the first wavelength and the third wavelength; and a second optical coupler which is coupled to the first EML and the second EML and outputs the combined optical signal by directly combining the second laser beam and the third laser beam.

14. The RoF network node of claim 13 further comprising:

an optical circulator which receives an input optical signal and provides isolation for the output laser beam from the first optical coupler;

a first power detector which is connected to the optical circulator and down converts the input optical signal into a third electrical signal; and an uplink transmitter which transmits the third electrical signal in an uplink path.

15. The RoF network node of claim 13 further comprising:

a radio access point (RAP) comprising:

a first optical splitter which receives an input optical signal and divides the input optical signal into a first optical signal and a second optical signal;

a first photodetector which is coupled to the first optical splitter, receives the first optical signal, and converts the first optical signal into the first electrical signal; and a second photodetector which is coupled to the first optical splitter, receives the second optical signal, and converts the second optical signal into the second electrical signal, wherein the first electrical signal and the second electrical signal are derived from the input optical signal.

16. The RoF network node of claim 15, wherein the input optical signal comprises a first carrier frequency and a second carrier frequency, claim 15 further comprising:

a first interleaver which is connected to the first optical splitter, receives the first optical signal and eliminates the second carrier frequency from the first optical signal; and a second interleaver which is connected to the first optical splitter, receives the second optical signal and eliminates the first carrier frequency from the second optical signal.

17. The RoF communication system of claim 16, wherein the RAP further comprising:

an Electroabsorption Modulated Laser (EML) which receives an uplink signal based on the first electrical signal or the second electrical signal and modulates a laser beam; and an optical circulator which is connected to the EML and the first optical splitter and provides the laser beam isolation from the input optical signal.

* * * * *